Figure 3:
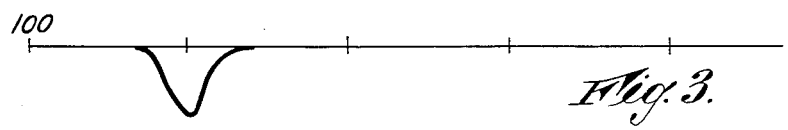

Feb. 13, 1962   J. G. BAYLY ET AL   3,021,427
LIGHT WATER ANALYSER
Filed Jan. 27, 1959   3 Sheets-Sheet 1
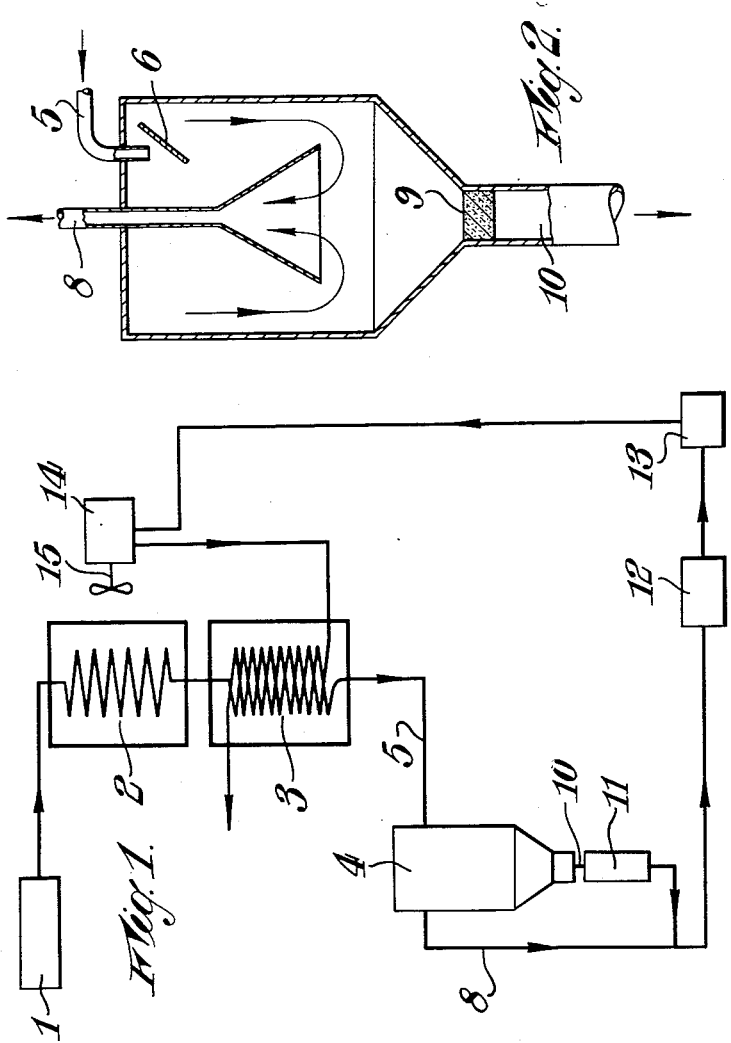
Inventors
John G. Bayly
William H. Sterens
By Sterens Davis Miller + Mosher
Attorneys Inventors
John G. Bayly
William H Stevens
By Stevens Davis Miller & Mosher
Attorneys Inventors
John G. Bayly
William H. Stevens
By Stevens Davis Miller & Mosher
Attorneys

3,021,427
LIGHT WATER ANALYSER
John G. Bayly and William H. Stevens, Deep River, Ontario, Canada, assignors to Atomic Energy of Canada Limited, Ottawa, Ontario, Canada, a corporation
Filed Jan. 27, 1959, Ser. No. 789,348
9 Claims. (Cl. 250—43.5)

The present invention relates to a monitoring system for providing an indication of the heavy water content of air and is a continuation in part of our U.S. application Serial No. 739,271, filed June 2, 1958, now abandoned.

The term "heavy water" is used to include both deuterium oxide and tritium oxide. Normally, deuterium oxide contains only a trace of tritium oxide but if the heavy water concerned emanates from an atomic pile the tritium content may be sufficiently increased above the normal content as to present a health hazard. Therefore, a monitoring system which is capable of providing an indication of the heavy water content of air is useful for two purposes, primarily to give an indication of the deuterium content of the air, secondarily, to give an indication of the tritium content of the air. A value for the tritium content can be derived if the tritium to deuterium ratio within the source of the heavy water in the air is known.

An indication of the tritium content of air is desirable where there is a possibility that the air contains such an amount of tritium as to be dangerous. An indication of the deuterium oxide content is useful as showing whether it is high enough to permit economic recovery of the heavy water.

It may, for example, be desirable to monitor an airstream used for cooling an installation capable of leaking heavy water. In this connection, the monitoring system might be used to control a moisture extracting process which would be actuated when the heavy water content reached such a level that its recovery became economically feasible.

It is an object of this invention to provide a monitoring system which is capable of indicating the heavy water content of air in a speedy and simple manner and without undue delay.

The invention provides a monitoring system for providing an indication of the heavy water content of air comprising means for condensing water vapour from the air, means for collecting the condensate, and means for estimating the deuterium content of the condensate by measuring the degree of absorption of infra-red radiation by said condensate in the neighbourhood of $\lambda = 4$ microns, an absorption wavelength of the H—D—O molecule.

Condensation of the water vapour from the air may be effected by any convenient method. The most direct method is to use refrigeration system to cool the air to below its dew point. Such a method is satisfactory in some climates but in many parts of the world (particularly in North America) it often happens that the relative humidity is so low that water vapour goes directly to frost. Normally this is so when the relative humidity is below about 20%. Since it is desirable for the monitoring system to be effective all the year round, it is therefore preferable to employ means for condensing the water vapour which will not be rendered ineffective as a result of a low relative humidity of the atmosphere.

According to the present invention, such means comprise in combination a compressor for compressing the air to be tested, for example to a pressure of from 5 to 10 atmospheres, and a cooling device to which the air is passed after having been compressed. The compression of the air serves to raise the water vapour pressure enough that condensation occurs if the air is then cooled to a temperature slightly above the freezing point of water.

The means for collecting the condensate may be of any type capable of separating the condensate from the associated air but preferably, is provided with filter means for removing bubbles of air from the condensate. The invention provides means for collecting the condensate which comprise a chamber within which the condensate and the associated air are grossly separated under the action of gravity and a porous member, preferably of sintered glass, located at the base of the chamber. So long as the capillaries of the porous member are filled with water, bubbles of air are prevented from passing the porous member, so that the water which does pass through is free from air bubbles and fit to be analysed by an infra-red analyser.

It is possible that even with the provision of such a porous member bubbles of air will still reach the infra-red analyser; this will be liable to occur if there are sudden fluctuations of pressure within the separating chamber of such intensity as to overcome the resistance to the passage of air bubbles through the porous element. In some applications of the monitoring system of the invention such pressure fluctuations will be so unlikely or infrequent as to render unnecessary any special precautions. However, when pressure fluctuation is likely to cause real difficulty in obtaining a steady stream of water free from air bubbles, the problem can be solved by providing a connection between the space within the separating chamber adjacent the porous member and the outlet from the infra-red analyser. Such a connection equalises the pressure between these points and thus ensures that the flow of water through the porous member takes place under the action of gravity alone and is not influenced by pressure variations in the separating chamber.

Preferably at least part of the cooling effected by the cooling device, which forms part of the preferred means for condensing the water vapour, is by means of cold air obtained by allowing air which has previously been compressed for condensing water therefrom to expand while doing work. Such an expansion (approximately adiabatic) causes considerable cooling, as is well known. The expansion may be conveniently effected in an air motor and the motor used to drive a fan which serves as an auxiliary source of cooling.

The compressed air for driving the air motor is conveniently withdrawn from the upper portion of the separating chamber and passed to the air motor by way of a main air line provided with an oiler and if, as is feasible, the effluent from the infra-red analyser is discharged into this main air line, a filter for removing water is also provided in the main air line. When a pipe connection is provided between the space within the separator adjacent the porous member and the outlet from the analyser, it is desirable to incorporate a branch air line extending from the main air line and connected by way of a valve to the pressure-equalising pipe connection referred to and by way of a second valve to the surrounding atmosphere. A small but steady stream of air from the main air line through this branch air line then serves to eject water from the system through the second valve; no water filter need then be provided in the main air line.

The means for estimating the deuterium content of the condensate may be an infra-red analyser of a kind adapted for use with two liquid cells, the infra-red absorption of two light paths, one through each of the liquid cells, is compared automatically. One liquid cell contains ordinary water, with the normal content of deuterium, and to the other cell is passed the condensate to be analysed. The instrument is sensitized at a wavelength which is strongly absorbed by the HDO molecule but not by the $H_2O$ molecule and is made insensitive to contaminants like carbon dioxide which may be expected in water condensed from air.

A suitable infra-red analyser may be produced by effecting certain modifications to the well-known infra-red analyser sold by the Perkin-Elmer Corporation under the trade name Tri-Non. This apparatus has already been used for the detection of light water in heavy water. For detection of heavy water in light water according to the present invention, it is necessary to use cell windows which will transmit light of a wavelength longer than $\lambda = 4$ microns, corresponding to an absorption frequency of the HDO molecule, and to use a detector gas having an absorption at the same wavelength. The detector gas is preferably deuterated ammonia since the N—D absorption bond is at 4 microns. Alternatively, sulphur dioxide, which absorbs at the same wavelength, may be used as the detector gas.

The monitoring system of the invention gives a direct estimate of the deuterium content of the air tested. Where the system is in use for detecting potential tritium hazard, i.e. near a reactor or other tritium producing installation, it is presumed that the deuterium in excess of the natural deuterium content in the condensed water comes from that installation; the tritium content of the condensed water can then be inferred from the excess deuterium content and the known T/D ratio in the installation.

The monitoring system of the invention is readily capable of detecting the presence of heavy water in magnitudes of the order of 2 grams heavy water in $10^6$ grams of light water; it is thus equivalent to tritium monitor which can detect $$2ht \times 10^{-6} \text{ curies/gm.}$$

where $h$ is the natural water content of the air in grams/cu. m. and the tritium activity of the heavy water is $t$ curies/gm. The equilibrium value of $t$ in a reactor may be of the order of $10^{-2}$ curies/gm.

The value of $h$ varies with the humidity, at 70° F., 30% humidity, $h = 5.5$ gm./m.$^3$, and under these conditions $0.11 \times 10^{-6}$ curies/m.$^3$ should be detectable.

The permissible level of T for continuous exposure during working hours is $20 \times 10^{-6}$ curies/m.$^3$. The instrument is a reliable health monitor for tritium.

The temperature coefficient of the monitoring system of the invention is not so high as to affect the accuracy of the results which can be obtained provided that the sample temperature is fairly accurately thermostated.

Figure 5:
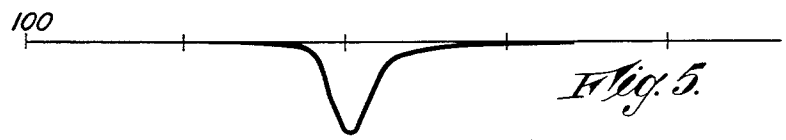
Figure 6:
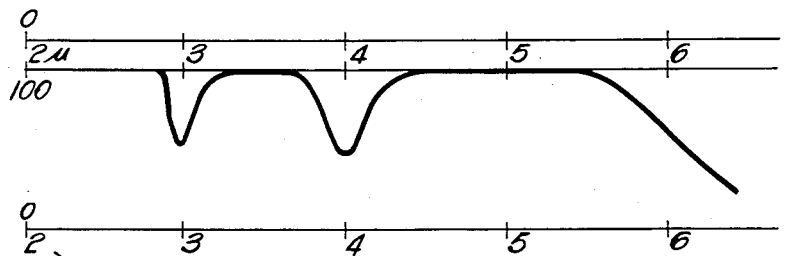
Figure 7:
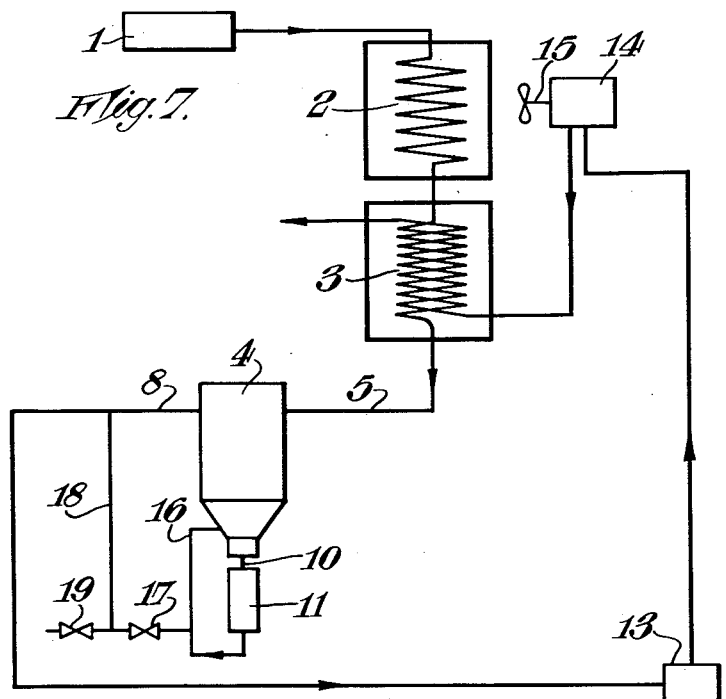
Figure 8:
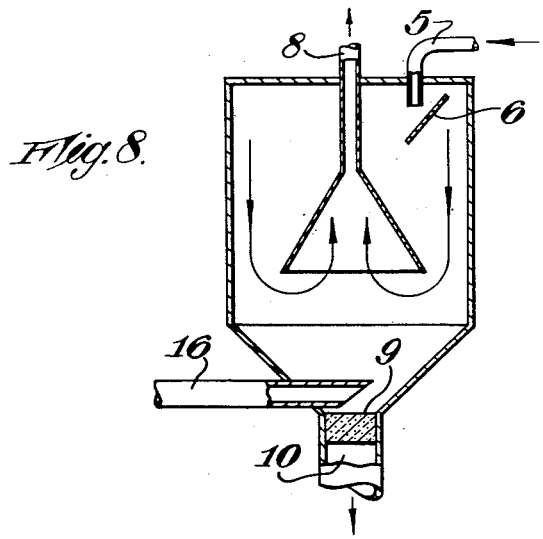

The invention will be described by way of example and without limitation with reference to the accompanying drawings in which, FIGURE 1 is a schematic view of a monitoring system of the invention, FIGURE 2 shows a separator which is part of the system of FIGURE 1, FIGURES 3 to 6 are schematic representations of infra-red absorption spectra, FIGURE 7 is a schematic view of a modification of the system shown in FIGURE 1, and FIGURE 8 shows a modified separator for use in the system of FIGURE 7.

The monitoring system shown in FIGURE 1 comprises a compressor 1 of standard type. The compressor 1 takes in the air to be tested and compresses it to 5 to 10 atmospheres, this compression serving to raise the temperature of the air to about 100 to 150° F. The compressed air is then put through a cooling device comprising a first heat exchanger 2 and a second heat exchanger 3. At the output of the heat exchanger 2 the temperature of the air has been reduced to about 80° F. At the output of the heat exchanger 3, the temperature of the air has been reduced to 32 to 40° F. and the pressure reduced to 4 to 8 atmospheres. Under these conditions of temperature and pressure, water vapour will condense if the relative humidity of the air is above about 5%. Since the lower limit of relative humidity at which water vapour can be condensed from air by refrigeration used alone is about 20%, the use of compression followed by cooling is clearly much superior to the use of refrigeration alone.

The condensate is withdrawn from the heat exchanger 3 and passed to a separator 4 (see FIGURE 2). The separator 4 comprises an inlet 5 which discharges the mixture of air and condensed water against a deflection plate 6 arranged inside the separator. The air passes from the separator by way of an outlet 8, the condensed water collecting in the bottom of the separator under the action of gravity.

Since it is not possible to carry out infra-red absorption analysis on liquid containing gas bubbles, it is necessary to remove bubbles of air from the condensed water. This is achieved by the provision of a disc 9 of sintered glass at the bottom of the separator. A pipe 10 leading from the separator 4 to an infra-red analyser 11 is permanently filled with water. Normally this water will have passed through the sintered glass disc 9 when the apparatus is in continuous use; otherwise the pipe 10 is filled with distilled water as a preliminary operation. The sintered glass of disc 9 acts as if it were a great many capillary tubes in parallel and water from the pipe 10 rises in the disc 9. The head of water in the small capillaries is such that passage of air bubbles through the disc 9 is prevented. For this purpose, a suitable porosity of sintered glass must be chosen but this offers no difficulty; the porosity must also be adequate to allow a large enough flow of water to the analyser 11.

The infra-red analyser 11 is of a type manufactured by the Perkin-Elmer Corporation and sold under the name Tri-Non. The instrument is modified for the purposes of the present invention in a manner which will subsequently be described.

After infra-red analysis of the water has been carried out, it passes from the analyser to be reunited with the air coming from the outlet 8 of the separator 4. The mixture is then passed through a conventional filter 12, of the kind described in U.S. Patent No. 2,726,732, and a conventional oiler device 13. The oiler device 13 adds oil droplets to the air stream in order to aid lubrication. The mixture is then passed to an air-motor 14 and allowed to do work. Because work is done, the output air from the air motor 14 is cooled and the cooled air is used for cooling purposes in the heat exchanger 3. The output from a fan 15 driven by the air motor 14 is used for cooling purposes in the heat exchanger 2.

The Tri-Non analyser has previously been used for estimating the amount of $H_2O$ in heavy water. The manner in which the modified instrument is used for the purpose of the present invention will be best understood by comparison with the previous use referred to.

Figure 4:
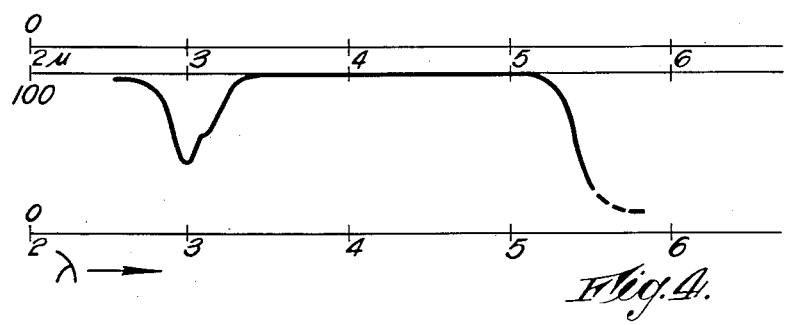

FIGURE 3 shows the change in transmission of a thin layer of heavy water when 0.13% of $H_2O$ is added, and FIGURE 4 shows the relevant transmission characteristics of $NH_3$. When the Tri-Non analyser is in use for detection of light water in heavy water, its detector cell is filled with $NH_3$ which absorbs strongly at the 3 microns wavelength so that the analyser detects the absorption at the same wavelength caused by the light water.

In order to use the analyser for estimating the quantity of heavy water in light water, the detector cell is filled with deuterated ammonia, $ND_3$. This absorbs strongly at a wavelength of 4 microns as also does HDO. FIGURE 5 shows the change in transmission of a thin layer of light water to which has been added 0.25% of $D_2O$. FIGURE 6 shows the transmission characteristics of deuterated ammonia, the absorption at 3 microns is due to residual light hydrogen but causes no trouble since this wavelength is completely absorbed in the light water cell.

Apart from the use of a different detector gas, the apparatus must be modified to allow transmission of the longer wavelength of 4 microns. Instead therefore, of using cell windows made of fused quartz as in the standard analyser, these windows must be made of synthetic sapphire or other material having similar transmission characteristics.

The infra-red analyser 11 has not been described in detail since it is of well-known type; a general description of such an analyser is to be found in U.S. Patent No. 2,754,424 and a description of the detector cell in U.S. Patent No. 2,767,321.

FIGURES 7 and 8 illustrate a modification of the monitoring system shown in FIGURES 1 and 2. Like parts are designated by like reference numerals.

A pipe 16 connects the air space immediately above the sintered glass disc 9 with the outlet from the analyser 11 thus equalising the pressure between these points. This ensures that the flow of water through the pipe 10 and the analyser 11 takes place only as a result of gravity and eliminates any tendency for air to be forced through the disc 9 as a result of fluctuating pressure conditions in the separator 4. The water issuing from the outlet of the analyser 11, together with some air from the pipe 16, passes through a valved constriction 17 to a branch pipe 18.

The pressure in pipe 18 is slightly lower than that in the pipe 16 due to the flow resistance of the pipe 8; as a result a small but steady stream of air flows from the pipe 8 through the pipe 18 and into the atmosphere by way of a valve 19. This stream of air serves to eject the water from the system. The majority of the air still flows through the pipe 8 to the oiler 13. Since little or no water now finds its way into the pipe 8, the filter 12 of FIGURE 1 is no longer required and is therefore omitted.

If the supply of condensate from the inlet 5 is inadequate, passage of water through the sintered glass disc 9 ceases but no air can penetrate the disc 9 since the pressure differential across it is only the gravity head resulting from the difference in elevation of the disc 9 and the valved constriction 17. When the supply of condensate from inlet 9 is normal this small pressure differential passes the water through the glass disc 9; if, however, under high humidity conditions, too much water is condensed, the excess overflows through the pipe 16.

The provision of the pipes 16 and 18 and the associated valves 17 and 19 affords a substantially complete safeguard against the passage of air bubbles into the pipe 10. Since, as mentioned earlier, the analyser 11 cannot operate properly unless the water supplied thereto is free from air bubbles, this is very desirable and the modified system shown in FIGURES 7 and 8 is therefore to be preferred to that shown in FIGURES 1 and 2; nevertheless the latter system is still useful, especially under conditions where sudden changes of pressure in the separator 4 are unlikely to occur.

The mode of use of the modified system according to FIGURES 7 and 8 is identical with that of the system of FIGURES 1 and 2 and will therefore not be described.

We claim:

1. A monitoring system for providing an indication of the heavy water content of air comprising means for condensing water vapour from the air, means for collecting the condensate, and means for estimating the deuterium content of the condensate by measuring the degree of absorption of infra-red radiation by said condensate in the neighbourhood of an absorption wavelength of the H—D—O molecule.

2. The monitoring system according to claim 1 in which said means for condensing water vapour from the air comprise in combination a compressor for compressing the air and a cooling device to which the air is passed after being compressed.

3. The monitoring system according to claim 2 in which air which has previously been compressed and cooled is allowed to do work by expansion and is then used as a coolant in said cooling device.

4. The monitoring system according to claim 1 in which said means for collecting the condensate comprises a separator having a chamber adapted to effect gross separation of the condensate and the associated air and at the base of said chamber a porous element adapted to prevent passage of air bubbles but to allow passage of an adequate flow of water.

5. The monitoring system according to claim 1 in which the means for estimating the deuterium content of the condensate is an infra-red analyser adapted for use with two liquid cells and sensitized at a wavelength of $\lambda=4$ microns.

6. A monitoring system for providing an indication of the heavy water content of air comprising means for condensing water vapour from the air, means for collecting the condensate comprising a separator having a chamber adapted to effect gross separation of the condensate and the air associated with the condensate and at the base of said chamber a porous element adapted to prevent passage of air bubbles but to allow passage of an adequate flow of the condensate therethrough, and means for estimating the deuterium content of the condensate consisting of an infra-red analyser adapted for use with two liquid cells and sensitized at a wavelength of $\lambda=4$ microns, a pipe connection being provided between the space within said chamber adjacent said porous element and the outlet from said infra-red analyser whereby pressure equalisation is effected between said space and said outlet.

7. A monitoring system for providing an indication of the heavy water content of air comprising a compressor for compressing said air, a cooling device for cooling the compressed air to cause condensation of water therefrom, a separating chamber adapted to effect gross separation of air bubbles from the condensed water under the influence of gravity and having a porous element at the base thereof, and in connection with the base of said chamber an infra-red analyser adapted for use with two liquid cells and sensitized at a wavelength of $\lambda=4$ microns.

8. The monitoring system of claim 7 wherein there is provided a pipe connection between the space within said chamber adjacent said porous element and the outlet from said infra-red analyser, whereby pressure equalisation is effected between said space and said outlet.

9. A monitoring system for providing an indication of the heavy water content of said air comprising a compressor for compressing said air; a cooling device for cooling the air compressed by means of said compressor to cause condensation of water therefrom; a separating chamber adapted to effect gross separation of the condensed water from air associated therewith having at the base thereof a porous element which allows passage of water but not, in the absence of applied pressure, of air bubbles therethrough; an infra-red analyser adapted for use with two liquid cells, sensitized at a wavelength of $\lambda=4$ microns and having an inlet and an outlet for the water to be analysed; a pipe connection between said inlet and the base of said separating chamber; a pipe connection between the space within said separating chamber adjacent said porous element and said outlet whereby pressure equalisation between said space and said outlet is effected; a main air line for withdrawing air from the upper portion of said separating chamber; and a branch air line extending from said main air line, said branch air line being connected through a valve with said pipe connection between said space and said outlet and also connected through a second valve with the atmosphere.

References Cited in the file of this patent

UNITED STATES PATENTS

| | | |
|---|---|---|
| 2,639,609 | Shands | May 26, 1953 |
| 2,654,242 | Fallgatter et al. | Oct. 6, 1953 |
| 2,732,710 | Richardson | Jan. 31, 1956 |
| 2,754,424 | Woodhull et al. | July 10, 1956 |